United States Patent [19]

McCloskey

[11] 3,998,504

[45] Dec. 21, 1976

[54] KEYED BEARING WITH INSERTS

[75] Inventor: Albert R. McCloskey, Fairfield, Conn.

[73] Assignee: The Heim Universal Corporation, Fairfield, Conn.

[22] Filed: Feb. 18, 1975

[21] Appl. No.: 550,444

[52] U.S. Cl. ............................................. 308/72
[51] Int. Cl.² .................... F16C 9/06; F16C 23/00
[58] Field of Search ............... 308/72, 207 R, 189, 308/206

[56] References Cited
UNITED STATES PATENTS

| 3,371,398 | 3/1968 | Patterson et al. | 308/72 |
| 3,550,232 | 12/1970 | Burnett | 308/72 |
| 3,552,808 | 1/1971 | Mathers et al. | 308/72 |

*Primary Examiner*—Lloyd L. King
*Attorney, Agent, or Firm*—James C. Wray

[57] ABSTRACT

A spherical bearing comprising an outer member having a hole extending from side to side, at least two bearing inserts abutting the surface of the hole, the outer surface of said inserts being concave and spherical so that they provide constricted portions at each side of the outer member, the outer member also having a keyway extending axially from side to side; a key in the keyway substantially co-extensive with the keyway, the key also having a concave and spherical top surface corresponding to the outer surfaces of the hole so that the key has shoulder portions corresponding to the constricted portions of the outer member; and a partially spherical inner member, the inner member being held in the outer member by impingement of the spherical surface of the inner member against the constricted portions of the outer member and the key being held in the outer member by impingement of the shoulder portions of the key against the spherical surface of the inner member, the inserts being held in the outer member by the spherical surface of the inner member and by the key.

10 Claims, 13 Drawing Figures

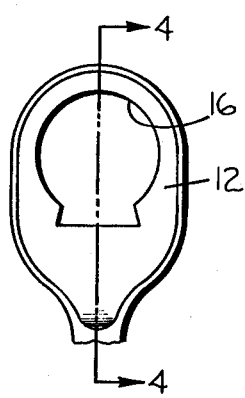
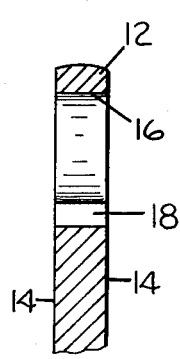
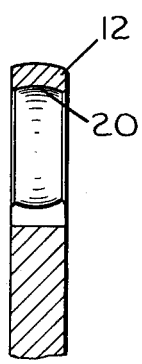
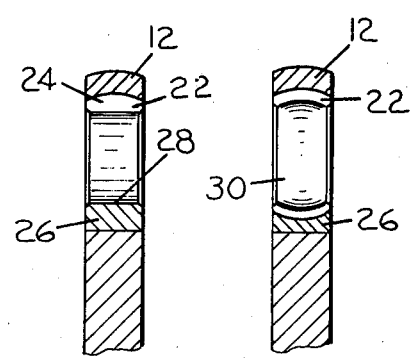
Fig.3  Fig.4  Fig.5  Fig.6  Fig.7
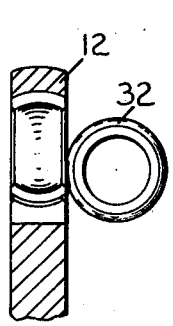
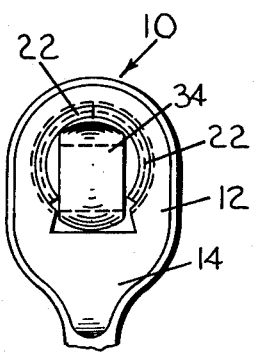
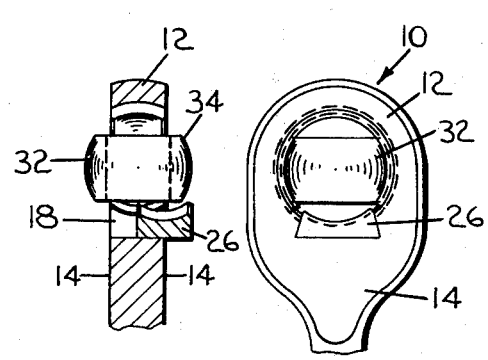
Fig.8  Fig.9  Fig.10  Fig.11
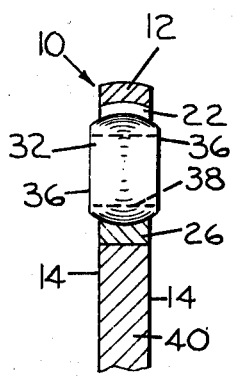
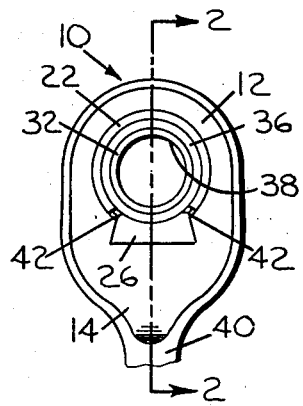
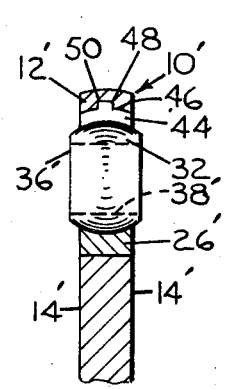
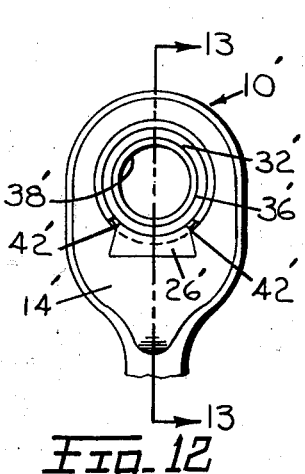
Fig.2  Fig.1  Fig.13  Fig.12

KEYED BEARING WITH INSERTS

BACKGROUND OF THE INVENTION

The present invention relates generally to self-aligning bearings having a ball-like inner member with a convex outer surface and an outer member having an inner surface with a complementary concave spherical inner face. These types of bearings, which are commonly called "spherical bearings," have been utilized in industry for a substantial period of time. The technological evolution of these type bearings has been directed more in the terms of material composition of its various component parts rather than toward basic changes in design concepts. Accordingly, the design advances in spherical bearings have not been substantial in nature and thereby presently limit their applications.

One area in which the spherical bearings have been extensively applied is high temperature applications. This is due to the spherical bearing self-aligning characteristic and the relative ruggedness of this type bearing. A typical such application is marrying of a spherical bearing to a valve actuator for a butterfly valve in a high pressure high temperature (e.g. 1000° F) steam system. In this application the outer race is commonly press-fitted or otherwise attached to actuator control linkage in a remote inaccessible area rendering it difficult to remove and/or maintain. When any such maintenance is required, such as replacing of the ball, the entire bearing assembly including the inner and outer race member would have to be removed and replaced by an entirely new bearing assembly. Such an operation could entail substantial expense and down time of the entire steam system.

There are a number of prior art type spherical bearings which have been addressed to this kind of problem. One such type prior art bearing is the "messerschmidt" bearing. A concept of this bearing is that the ball can be removed in the field without disassembling the entire bearing, that is, removing the outer race member from its mounting.

One may refer to my prior invention in this general field as embodied in U.S. Pat. No. 3,365,249, Patented Jan. 23, 1968 and entitled "Spherical Bearing." This particular bearing may be disassembled in the field but does not include the provision of changing the inner surface of the outer member. This area can become particularly vulnerable to damage, corrosion, wear and the like in high temperature applications.

SUMMARY OF THE INVENTION

It is therefore a primary object of the present invention to provide a spherical bearing comprising an outer member having hole extending from side to side, at least two bearing inserts abutting the surface of the hole, the outer surface of said inserts being concave and spherical so that they provide constricted portions at each side of the outer member, the outer member also having a keyway extending axially from side to side; a key in the keyway substantially co-extensive with the keyway, the key also having a concave and spherical top surface corresponding to the outer surfaces of the hole so that the key has shoulder portions corresponding to the constricted portions of the outer member; and a partially spherical inner member, the inner member being held in the outer member by impingement of the outer member and the key being held in the outer member by impingement of the shoulder portions of the key against the spherical surface of the inner member, the inserts being held in the outer member by the spherical surface of the inner member and by the key.

It is another object of the present invention to provide a spherical bearing wherein said inerts have a spherical inner surface corresponding to the outer surface of said outer member.

It is still another object of the present invention to provide a spherical bearing wherein the inserts are a hardened non-swagable metal alloy.

It is a further object of the present invention to provide a spherical bearing wherein the inserts are a non-metallic material.

It is yet another object of the present invention to provide a spherical bearing wherein there are two inserts and one key.

It is still another object of the present invention to provide a spherical bearing wherein the inserts are a laminated structure having a high temperature self-lubricating material in their outer bearing surface.

It is still another object of the present invention to provide a spherical bearing wherein the outer surface of the inserts have a key adapted to register with a slot in the inner surface of the outer member to further interlock the inserts within the outer member.

It is still another object of the present invention to provide a spherical bearing wherein the key is co-extensive with the keyway, and the keyway is walled and extends downward from the hole in the outer member.

It is yet another object of the present invention to provide a spherical bearing wherein the inner member has flat sides and the outer member is provided with flat sides which are substantially perpendicular to the flat sides of the key when said key is placed in said keyway.

It is yet another object of the present invention to provide a method of manufacturing a spherical bearing having an outer member, an inner spherical member, bearing inserts interposed between the inner and outer members and a key disposed in a keyway in the outer member to enable the assembly and disassembly of the spherical bearing comprising the steps of forming a hole in the outer member, forming a keyway in wall of the outer member to receive a key, forming the inner surface of the outer member to receive bearing inserts, placing the inserts in the outer member and placing the key in the keyway, forming the inner bearing surface on the outer surface of the inserts and key, removing the key from the keyway, placing the inner member in the outer member and keyway and rotating the inner member out of the keyway, placing the key back in the keyway, rotating the inner member to its operational position.

It is yet another object of the present invention to provide a method of manufacturing a spherical bearing wherein the hole is formed in the outer member by boring and the keyway is formed in the outer member by broaching.

It is still another object of the present invention to provide a method of manufacturing a spherical bearing wherein the inner bearing surface of the outer member is formed by boring.

Embodiments of the bearing according to the concept of the present invention are shown and/or described by way of example in the accompanying drawings and following description of the invention without attempting to show or describe all of the various forms and modifications in which the invention might be embodied; the invention being measured by the appended claims and not by the details of the specification.

BRIEF DESCRIPTION OF THE DRAWINGS

FIG. 1 is a side elevational view of an assembled bearing in accordance with the present invention;

FIG. 2 is a sectional view of the spherical bearing assembly of FIG. 1 taken along line 2—2;

FIG. 3 is a side elevational view of the outer member of spherical bearing of FIG. 1 with the hole and keyway formed therethrough;

FIG. 4 is a sectional view of the outer member of FIG. 3 showing the substantially cylindrical hole and a keyway formed therethrough;

FIG. 5 is a sectional view of the outer member of FIG. 3 showing the inner surface of the outer member thereof formed to receive bearing inserts;

FIG. 6 is a sectional view of the outer member of FIG. 3 showing the outer member with the inserts and key in place;

FIG. 7 is a sectional view of the outer member of FIG. 3 showing the outer member of FIG. 6 with the inserts and key formed to provide the inner bearing surface of the outer member.

FIG. 8 is a sectional view of the outer member of FIG. 7 with the key removed from the keyway and showing the beginning of step of placing the inner member within the outer member;

FIG. 9 is a side elevational view of the inner and outer member of FIG. 8;

FIG. 10 is a sectional view of the spherical bearing of FIGS. 1 and 2 just before complete assembly showing the inner member rotated out of the keyway area and the key about to be finally inserted in the keyway;

FIG. 11 is a side elevational view of a preassembled bearing of FIG. 10;

FIG. 12 is a side elevational view of an assembled bearing of another embodiment of the present invention;

FIG. 13 is a sectional view of the spherical bearing assembly of FIG. 12 taken along line 13—13.

DESCRIPTION OF THE INVENTION

A spherical bearing and parts thereof embodying the concept of the present invention is generally indicated, as appropriate, by numeral 10 on the attached drawing as set forth in FIGS. 1 through 11, inclusive. The bearing 10 shown is of the rod end spherical bearing variety, however, the present invention is also applicable to spherical bearings as well.

FIGS. 1 through 11 show the bearing 10 and its parts in various stages of assembly. In particular FIGS. 3 and 4 show an outer member 12 which may be provided with substantially flat sides 14. The outer member 12 is also provided with a substantially cylindrical 16 hole or bore formed therethrough as by boring or drilling or the like.

The FIGS. 3 and 4 also show the outer member having a keyway formed therein and therethrough. The keyway 18 can be shaped in a variety of patterns and the like. However, the keyway 18 shown in FIG. 3 is of the dovetail variety. The keyway 18 can be formed using various different machining operations, for example, a broaching tool could be used to so dovetail the keyway 18. It is of particular note that at this juncture the outer member 12 has a bore 16 which has not yet been preformed in any manner, that is, the bore 16 is substantially cylindrical in form.

Referring now to FIG. 5, the inner surface of the outer member 12 is further formed to provide at its inner surface a concave surface 20. The concave surface 20 is provided on the inner surface of the outer member 12 to accept the insertional placing of inserts. This next step can best be seen in FIG. 6 in which inserts 22 have been placed in the now formed bore of the outer member 12. The outer surface of inserts 22 have been formed in a convex surface 24 complementary to the concave surface 20 provided on the inner surface of the bore of the outer member 12. A key 26 is also shown in FIG. 6 inserted or placed within the keyway 18. FIG. 6 therefore depicts the spherical bearing assembly with all its components except the inner member which is to be referred to below. It can be seen from FIG. 6 that the inner surface of both the key 26 and the inserts 22 comprise generally the cylindrical bore 28. It is this area defined by the cylindrical bore 28 that will ultimately provide the bearing surface for the yet to be described member.

FIG. 7 illustrates the outer member and its various components further formed to operationally accept and accommodate the inner member. In particular it can be seen in FIG. 7 that the inserts 22 and key 26 have now been preformed such that their inner surfaces now present a concave inner surface 30. The preforming step with the inserts 22 and key 26 in place can be accomplished with a number of machining operations as, for example, the concave inner surface 30 may be generated by a boring machine.

After the concave inner surface 30 has been generated, the key 26 may be removed from keyway 18. This is shown in FIG. 8. When the key 26 is so removed, the inner member 32 can be placed within the outer member 12. The outer profile of the inner member 32 can be seen in FIG. 9 which shows the accommodation of the entire inner member within the outer member 12. The inner member is provided with a concave surface 34 which is complementary to the concave 30 as presented by the outer surfaces of the inserts 22 and key 26. It may be noted at this point that there is shown in FIG. 9, in particular, that there are two inserts 22. Certainly, other numbers and combinations of inserts are possible within the scope of the present invention.

Referring now to FIGS. 10 and 11, it can be seen that the inner member has now been rotated out of and away from keyway 18. When the inner member 32 is in this position, the key 26 maybe inserted into the keyway 18 without any interference from the inner member 32. FIG. 11 again shows the side profile of the inner member 32 within the outer member 12 and rotated away from the key area 26. It also shows the key inserted within the keyway 18.

With the key finally inserted within the keyway 18, the bearing 10 is in its assembled state. As before mentioned, FIGS. 1 and 2 best illustrate the assembled bearing. It can be seen that the inner member 32 is provided with two flat sides 36 and a central bore 38 therethrough. The bearing 10 is shown as a rod and spherical bearing for operational attachment at the central bore 38 and at the end of the shank 40 of the outer member 12. Obviously, the shank 40 may be provided with a threaded portion (not shown) or internal threads (also not shown) depending upon application. Bearing 10 could also be configured in a spherical bearing arrangement without an extension or shank portion 40.

As can be seen in FIG. 1, key 26 abuts an end of each of the inserts 22 at junction 42. It is the abutting action of the key 26 against the ends of the inserts 22 and the convex surface of the inner member 32 that holds the inserts 22 in position within the outer member 12.

We have seen the various steps of forming an assembly of the spherical bearing 10 as depicted in FIGS. 1 through 11. The disassembly of the bearing is accomplished in the reverse and is best shown by FIGS. 11, 10, 9 and 8. All that is required for such disassembly is the rotation of the inner member 32 to the position as shown in FIG. 11. This facilitates the removal of the key 26 from the keyway 18. Thereupon, inner member 32 may be rerotated to a position as shown in FIG. 9 and thereafter as shown in FIG. 8. At this point, the inserts 22 may be removed and/or replaced by new inserts and subsequently the bearing 10 could be reassembled by retracing the steps shown in FIGS. 8 through 11. This efficient expeditious form of assembly and disassembly facilitates easy maintenance and overhaul of the bearing 10 in the field. It also makes bearing 10 particularly adaptable for adverse environmental applications, such as high temperature applications in which the bearing 10 experiences temperatures in excess of 1000° F. In such high temperature applications, the inserts can be manufactured from a select group of materials making them particularly adaptable for high temperature purposes and thereby obviating the need for making the entire outer member 12 of the same material which in many cases are difficult to machine and costly to buy. Such materials could be selected from a group of hardened non-swagable alloys such as tool steel or 400 Series fully heat treated stainless steel or cobalt alloy steel. Further, the inserts 22 could be manufactured from a range of nonmetallic materials such as certain carbon and ceramic materials.

FIGS. 12 and 13 show another embodiment of the bearing which depicts similar components to that of bearing 10 which are shown with the "prime" affixed thereto.

The major difference of the bearing 10' of the bearing 10 is to be found in the outer surface of the inserts 44 and inner surface 46 of the outer member 12'. In particular the outer surface of the inserts 44 is substantially cylindrical in form having thereon a centrally disposed rib 48. The rib 48 is adapted for registration in an annular groove 50 disposed on the inner surface 46 of the outer member 12'. The rib 48 further interlocks and operationally positions the inserts 44 within the outer member 12' by its registration within the annular groove 50.

From the above description of the invention along with various figures as set forth in the drawings, it will be readily seen and appreciated that a spherical bearing embodying the concept of the present invention will positively and effectively accomplish the objectives of the invention. The above noted embodiment is shown by way of example without attempting to show all the various forms and modifications in which the invention might be embodied; the invention being measured by the appended claims and not the specific details of the specification.

I claim:

1. A spherical bearing comprising an outer member having a hole extending from side to side, at least two bearing inserts abutting the surface of the hole, the outer surface of said inserts being concave and spherical so that they provide constricted portions at each side of the outer member, the outer member also having a keyway extending axially from side to side; a key in the keyway substantially co-extensive with the keyway, the key also having a concave and spherical top surface corresponding to the inner bearing surface of the outer member of the hole so that the key has shoulder portions corresponding to the constricted portions of the outer member; and a partially spherical inner member, the inner member being held in the outer member by impingement of the spherical surface of the inner member against the constricted portions of the outer member and the key being held in the outer member by impingement of the shoulder portions of the key against the spherical surface of the inner member, the inserts being held in the outer member by the spherical surface of the inner member and by the key.

2. A spherical bearing assembly in according with claim 1 wherein the said inserts are manufactured from the hardened non-swagable metal alloy.

3. A spherical bearing assembly in accordance with claim 1 wherein the said inserts are manufactured from a nonmetallic material.

4. A spherical bearing assembly in accordance with claim 1 wherein there are two inserts and one key.

5. A spherical bearing assembly in accordance with claim 1 wherein said inserts are manufactured in a laminate structure having a high temperature self-lubricating material on its bearing surface.

6. A spherical bearing assembly in accordance with claim 1 wherein the outer surface of said inserts has a key formed thereon and adapted to register with the annular groove disposed in the inner surface of the outer member to further interlock said inserts within said outer member.

7. A spherical bearing assembly in accordance with claim 1 wherein said key is co-extensive with said keyway and said keyway is walled and extends downward from said hole in the outer member.

8. A spherical bearing assembly in accordance with claim 1 wherein said inner member has flat sides and said outer member is provided with the flat sides which are substantially perpendicular to the flat sides of said key when said key is placed in said keyway.

9. A spherical bearing assembly in accordance with claim 1 wherein said keyway is formed in a dovetail profile.

10. A spherical bearing assembly in accordance with claim 1 wherein the said inserts are manufactured from a soft metallic material.

* * * * *